UNITED STATES PATENT OFFICE.

CHARLES F. AMPT, OF WYOMING, OHIO.

FOOD PRODUCT AND METHOD OF PREPARING SAME.

1,261,995.　　　　　　　Specification of Letters Patent.　　　Patented Apr. 9, 1918.

No Drawing.　　　　Application filed November 3, 1917. Serial No. 200,097.

*To all whom it may concern:*

Be it known that I, CHARLES F. AMPT, a citizen of the United States, residing at Wyoming, in the county of Hamilton and State of Ohio, have invented certain new and useful Improvements in Food Products and Methods of Preparing Same, of which the following is a specification.

My invention relates to food-stuffs, and its object is to provide a food which, while being palatable and nutritious and adapted to keep preserved for a long period of time, will have bowel-lubricating properties.

Another object of my invention is to impart to the food these properties by means of the "shortening" ingredient of the food.

My invention consists in the improved food or composition of food-stuffs and in the method of preparing and combining these food-stuffs, and of producing the composition or combination of food-stuffs.

Broadly stated, my invention comprehends the association in a food preparation of a nutritive element, together with an element to impart to it the bowel-lubricating properties above referred to; this latter element also preferably being the "shortening" ingredient of the food. As is well known, the most effective "shortening" ingredients are fatty or oily substances of animal or vegetable origin, as for instance, lard or cotton-seed oil. These fatty ingredients, however, as they are well known, are digested and assimilated and are really nutritive elements, along with the elements for which they perform the "shortening" function. That is to say, such usual "shortening" ingredients lack the properties which I have above alluded to of lubricating the bowels and thus promoting their excretory action, without being assimilated.

There are substances having these bowel-lubricating properties, as for instance, the refined white medicinal oils now extensively used for this purpose. These oils are of petroleum and hence of mineral origin. They are colorless, tasteless and odorless, and are neutral and inert when present in the alimentary tract; they are not digested nor assimilated, but act merely as a lubricant, and hence as a laxative, without any of the objectionable consequences associated with most other laxatives. These properties of these oils are well-known, and these oils have been extensively used as medicines taken in definite doses and not in association with any other substance. When thus taken, the expected benefits are derived, but frequently not without the accompaniment of some objectionable consequences, as the running of the oil due to its extreme thinness and its ability to pass entirely through the alimentary tract without combining with any other substances or being digested or assimilated in the least degree.

My invention comprehends the combination of such an oil, preferably the petroleum oil just referred to, or any other petroleum oil or other mineral oil, or any other oil or oleaginous substance having the property of promoting excretory action without becoming digested or assimilated, together with some food-stuff highly desirable for its nutritiveness or its flavor or consistency, or all of these, in such a manner that the resultant composition will combine within itself all of the properties of both kinds of ingredients, i. e., so that the resultant food-stuffs will be nutritious, palatable, of an attractive consistency, and at the same time, favorable to the promotion of the excretory action of the bowels without contributing an undue proportion of fatty elements to the body.

Food answering to the requirements of my invention is disclosed and claimed in my co-pending application, Serial No. 200,098, filed November 3, 1917. In this present application, however, I set forth a food which is novel, not only in its ingredient having the desired physiological effect as just alluded to, but also in the combination of nutritive ingredients.

In carrying my invention into effect and as illustrating one embodiment thereof, I produce a food in substantially the following manner:

Any kind of cereal, either whole, broken or ground, is placed in a receptacle. A highly refined and bleached petroleum oil is then added and the contents are stirred until thoroughly mixed. Bran is then added and the whole stirred again until thoroughly mixed. Salt is then dissolved in water and added to the mixture which is again thoroughly mixed. An example of the proportions of the ingredients is substantially 6 ounces of white corn meal, 3 ounces of highly refined, bleached mineral oil, 2¾ ounces of bran, ⅛ ounce of salt, and 8 ounces of water. This mixture is cooked until all of the water has been eliminated, after which time it may be said that the food has been thoroughly cooked. The process continues, but from that time on it is a process of toasting, rather than cooking until the operation is completed. More or less stirring may or may not be done during the heating, but preferably it should be almost constant and the heater should preferably have a cover to give it the effect of an oven.

I have discovered that mineral oil acts as a "shortening" in the food without making the food rich or indigestible, which is not the case when animal or vegetable oils or fats are used for the purpose. Also, the mineral oil when mixed with the food, or associated with the food, keeps bugs and insects out, prevents the food from absorbing moisture and prevents air from coming in contact with the food, thereby preserving the food indefinitely. The mineral oil acts not only as a shortening, but as a preservative of the food and prevents it from becoming rancid. When used as a shortening, preservative or laxative in the food, the mineral oil is practically odorless and tasteless, and mixing the food with the mineral oil, either before, after or while cooking or treating gives it a laxative effect, on account of the fact that the system absorbs the nutritive properties of the food, but does not absorb the mineral oil, and the mineral oil while mixed with the food and waste matter, acts as a lubricant as it passes through the stomach, intestines and bowels.

Wheat middlings or other material may or may not be added and thoroughly mixed with the grain and oil, depending upon the nature of the product desired.

The mineral oil, or most of it, remains mixed with the food and prevents the particles of food from sticking together or to the sides and bottom of the cooker. It is the mineral oil that remains mixed with the food after the completion of the process that acts as a lubricant as it passes through the stomach, intestines and bowels.

While I prefer to produce the product in accordance with the process as set forth, desirable results may be accomplished by slight variations in the order or manner of mixing and treating the ingredients, or by slight variations in the quantities of the ingredients. While I have set forth a particular kind of cereal and other materials, it will be understood that desirable results will be obtained in treating any kind of grain with any kind of oil which has the qualities of a shortening, as well as preventing the mixture from sticking to the vessel when being cooked, while acting as a preservative and laxative, without being assimilated.

It will be understood, therefore, that while I have set forth a particular and definite formula and process of combining and treating the same, I do not limit my invention thereto, but what I claim and desire to secure by Letters Patent is:

1. A food consisting of a farinaceous material and a mineral oil thoroughly mixed and cooked.

2. A food consisting of a ground cereal and a mineral oil thoroughly mixed and cooked.

3. A ground cereal food having an oleaginous ingredient which is neutral and inert when present in the alimentary tract, is not digested nor assimilated, and which promotes the excretory action of the bowels.

4. A ground cereal food having an oleaginous ingredient of mineral origin, which is neutral and inert when present in the alimentary tract, is not digested nor assimilated, and which promotes the excretory action of the bowels.

5. A ground cereal food having an oleaginous ingredient of petroleum origin, which is neutral and inert when present in the alimentary tract, is not digested nor assimilated, and which promotes the excretory action of the bowels.

6. A food comprising a farinaceous ingredient normally adapted to agglutinate on cooking, and an oleaginous ingredient adapted to counteract the agglutination during cooking, and which is neutral and inert when present in the alimentary tract, and is not digested nor assimilated.

7. A food comprising a ground farinaceous ingredient normally adapted to agglutinate on cooking, and an oleaginous ingredient adapted to counteract the agglutination during cooking, and which is neutral and inert when present in the alimentary tract, is not digested nor assimilated, and is adapted to promote the excretory action of the bowels.

8. A food comprising a farinaceous ingredient normally adapted to agglutinate on cooking, and an oleaginous ingredient of mineral origin adapted to counteract the agglutination during cooking, and which is neutral and inert when present in the alimentary tract, is not digested nor assimilated, and is adapted to promote the excretory action of the bowels.

9. A food comprising a farinaceous ingredient normally adapted to agglutinate on cooking, and an oleaginous ingredient of petroleum origin, adapted to counteract the agglutination during cooking, and which is neutral and inert when present in the alimentary tract, is not digested nor assimilated, and is adapted to promote the excretory action of the bowels.

10. A food consisting of substantially 6 ounces of cereal ingredient, 3 ounces of refined bleached mineral oil, 2¾ ounces of bran, ¼ ounce of salt, and 8 ounces of water.

11. The method of producing a food product consisting in first mixing a cereal with a mineral oil, then adding to this mixture a solution of water and salt, then mixing the whole thoroughly, then cooking and stirring the mixture until the water is driven off, then toasting the residue.

12. The method of producing a food product consisting in first mixing a cereal with a refined and bleached petroleum oil, then adding bran or middlings or other farinaceous material and mixing the same with the ground cereal and oil, then adding to this mixture a solution of water and salt or any seasoning or flavoring, then mixing the whole thoroughly, then cooking the mixture until water is driven off, then toasting the residue.

13. A food product comprising a whole cereal ground and mixed with a mineral oil, and a fractional cereal thoroughly mixed with said whole cereal and oil.

14. A food product comprising a whole cereal, a mineral oil, a fractional cereal, and suitable seasoning thoroughly mixed together.

15. A food product comprising a whole cereal, a mineral oil, a fractional cereal, and suitable seasoning thoroughly mixed together and cooked.

16. A food product comprising a farinaceous ingredient, and an odorless and tasteless oily mineral ingredient mixed together.

17. A food product comprising a farinaceous ingredient, and a highly refined mineral oil mixed together.

18. A food product comprising a farinaceous ingredient, and a highly refined mineral oil mixed together and cooked.

19. The method of preparing a food which consists in cooking said food together with an oleaginous mineral ingredient, and retaining said oleaginous mineral ingredient in said food for ultimate use in the food.

20. The method of preparing a food which consists in cooking a farinaceous ingredient together with an oleaginous mineral ingredient, and retaining said oleaginous mineral ingredient in said food for ultimate use in the food.

21. The method of preparing a food which consists in mixing together a farinaceous ingredient and an oleaginous mineral ingredient, and cooking said mixed ingredients until the water of the farinaceous ingredient is driven off, and then toasting or desiccating at a temperature that will not drive off the oil, whereby said mineral oil is retained mixed with the cooked and desiccated farinaceous ingredient.

CHARLES F. AMPT.

Witnesses:
JAMES N. RAMSEY,
CLARENCE PERDEW.